UNITED STATES PATENT OFFICE.

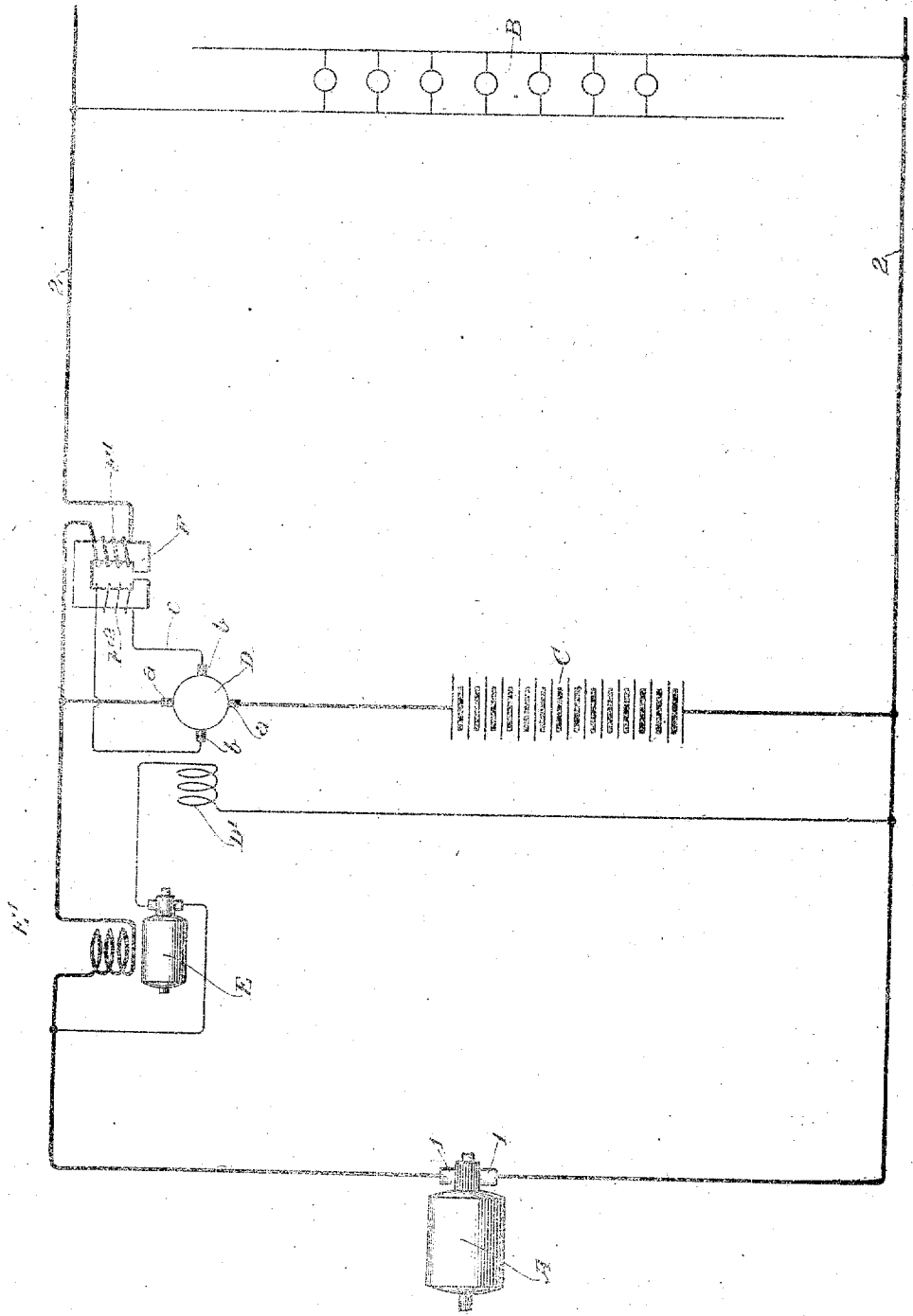

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

969,008.  Specification of Letters Patent.  Patented Aug. 30, 1910.

Application filed February 25, 1908. Serial No. 417,754.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and more especially to the better regulation of boosters in systems where they are employed to govern the action of a storage apparatus. In well-known systems of the above class it has been customary to provide a sole regulating means which embraces a generator operating to excite the booster field. One of the great disadvantages of such a regulating means is that it fails to respond quickly enough to certain sudden changes or peaks in the load on the system. These sudden changes or peaks especially of short duration, are therefore taken by the main generator of the system, and not by the storage apparatus or battery.

The objects of my invention are generally to provide a better system of regulation for such systems and principally to provide means whereby these sudden changes or peaks in the load on such systems will be taken by the storage apparatus or battery and the load on the generator will in no case exceed its approximate normal value. In the accomplishment of these objects I provide a transformer the primary of which is placed in series in the main or work circuit of the system. The booster instead of having only the usual brushes is provided with brushes which contact with the commutator approximately at the points of zero difference of potential, and to these brushes is connected the secondary of the transformer. If now a sudden change of current or load in the main circuit takes place an electromotive-force will be set up in the secondary of the transformer which in turn will cause a current to pass through the booster armature in such a direction as to set up a magnetic field parallel to the magnetic field set up by the usual booster field windings. This change in the booster field strength causes its voltage to change to properly operate the battery to cause it to supply the extra current required for the peaks in the load on the system. One of the great advantages of such a system is, that the more rapid and greater the increase in load, the more rapid and effective is the transformer for increasing the booster field strength and causing the battery to discharge into the main circuit to take the increase in load. These and more specific features of my invention will be more fully described in the detailed description given below taken in connection with the accompanying drawing which shows a diagrammatic view of a system embodying one form of my invention.

In the drawing A represents the armature of the main generator which under normal conditions is adapted to supply the work circuit B through the brushes 1, 1, and mains 2, 2. Connected in series across the mains 2, 2, is a battery or other storage device C, and the booster D. The booster D is provided with the usual field winding D′ connected in series with the armature E of a counter-electromotive force generator across the mains 2, 2. The armature E of the counter-electromotive generator and the armature of the booster D are driven in any well-known manner as by a separate motor or motors connected across the mains or otherwise. The counter-electromotive force generator is provided with a field, E′ in series on one of the mains 2. Under normal conditions the strength of this field is such that the voltage produced in the armature E is just equal and opposite to that produced by the main generator A. Therefore no current will pass through the field D′ and the battery will float across the line. However, if a gradual increase of load takes place the voltage of the armature E will increase, a current will flow through the field D′ and the booster will generate a voltage to cause the battery to discharge into the mains to take the extra load. Likewise if there is a decrease of load the booster will operate to cause the battery to be charged from the mains and thus tend to keep the load on the main generator A constant. The booster is provided with brushes, a, a, placed at approximately the points of greatest difference of potential of the commutator of the booster armature. One of these brushes is connected to one of the mains, 2, and the other to the battery, C.

It is well-known that if in an ordinary generator having an armature with distributed windings, a current is passed through the armature from points 90 electrical degrees from the points of electrical difference of potential, a magnetic field will be set up, the flux of which will be parallel to the flux produced by the external field windings of the generator. In carrying out my invention I employ these principles and to that end the booster D is provided with brushes b, b, contacting with the commutator approximately at the points of zero difference of potential. Placed in series in one of the mains, 2, are the primary coils F' of a transformer F. The secondary coils F² of the transformer are connected directly to the brushes b, b, and the circuit c, is completed through the armature coils of the booster. Now if a sudden increase of load takes place the increase of current will pass through the primary coils F'. This will cause an electromotive force to be set up in the coils F² and a current will flow through the circuit, c, and the booster armature. This current will produce a magnetic field in the booster in such a direction as to cause an increase of the electromotive force produced in the booster, and this increase in electromotive force will be in such a direction that it will cause the battery to discharge into the mains 2, 2, and supply the extra current due to the increase in the load. From the well-known principles of transformer action it will be understood that the greater and more rapid the sudden change in load, the greater will be the electromotive force produced in the secondary coils F² and the more quickly and effectively will this electromotive force act upon the booster to produce the required field strength therein. It will thus be apparent that by my improved arrangement any sudden increase of current in the coil F' will be practically instantaneously felt by the booster to cause the discharge of the battery into the mains, 2, 2. This regulating action is not hampered by hysteresis or other causes but takes place in the shortest possible time, so that no matter how sudden or great the peaks in the load the booster will be regulated and the battery caused to discharge to furnish the extra current required.

It is obvious that the principles of my invention as herein described may be applied to many different specific systems, either where voltage or where current regulation is the dominating regulation. I do not, therefore, limit myself to the specific features shown and described but

What I claim as my invention and desire to protect by Letters Patent is:

1. In a system of electrical distribution, the combination of a main generator, a circuit connected thereto, a storage device and a booster connected to said circuit, and a transformer in said circuit, the secondary of said transformer being connected with the booster armature for regulating said booster responsive to variations in the electrical condition of the system.

2. In a system of electrical distribution, the combination of a main generator, a circuit connected thereto, a storage device and a booster connected to said circuit, and a transformer in said circuit responsive to sudden variations in the electrical condition of the system, the secondary of said transformer being connected to the booster armature for varying the field strength of the booster.

3. In a system of electrical distribution, the combination of a main generator, a circuit connected thereto, a storage device and a booster connected to said circuit, means for varying the booster field strength responsive to gradual changes in the electrical condition of the system, and means connected in series with the booster armature for producing an auxiliary field responsive to sudden variations in the electrical condition of the system.

4. In a system of electrical distribution, the combination of a main generator, a circuit connected thereto, a storage device and a booster connected to said circuit, means for regulating said booster responsive to gradual changes in the electrical condition of the system, and a transformer in said circuit responsive to sudden changes in the electrical condition of the system, the secondary of said transformer being connected to the booster armature approximately at the points of zero difference of potential.

5. In a system of electrical distribution, the combination of a main generator, a circuit connected thereto, a storage device and a booster connected to said circuit, means for varying the booster field strength responsive to gradual changes in the electrical condition of the system and a transformer in said circuit, the secondary of said transformer being connected in series with the booster armature for producing an auxiliary field responsive to sudden variations in the electrical condition of the system.

6. In a system of electrical distribution, the combination of a main generator, a circuit connected thereto, a storage device and a booster connected to said circuit, a counter-electromotive force device in series with the booster field and responsive to gradual changes in the electrical condition of the system, and a transformer in said circuit responsive to sudden changes in the electrical condition of the system, the booster armature being connected in series with the secondary of said transformer approximately at the points of zero difference of potential of said armature.

7. In a system of electrical distribution, the combination of a circuit, a storage apparatus connected across said circuit, a booster in operative relation therewith, and a transformer having its primary responsive to certain variations in the electrical condition of the system and having its secondary connected with windings on the booster armature to produce a field flux therein.

In testimony whereof, I have signed my name to this specification, in the presence of two subscribing witnesses.

WILLIAM A. TURBAYNE.

Witnesses:
A. B. BRIMMER,
C. C. EASTERBROOKS.